March 14, 1961 E. M. MUHLECK 2,974,973
STEERING ASSEMBLY FOR AUTOMOTIVE VEHICLES
Filed Feb. 21, 1958 4 Sheets-Sheet 1

INVENTOR.
Earl M. Muhleck.
BY
Harness, Dickey & Pierce
ATTORNEYS.

March 14, 1961 E. M. MUHLECK 2,974,973
STEERING ASSEMBLY FOR AUTOMOTIVE VEHICLES
Filed Feb. 21, 1958 4 Sheets-Sheet 2
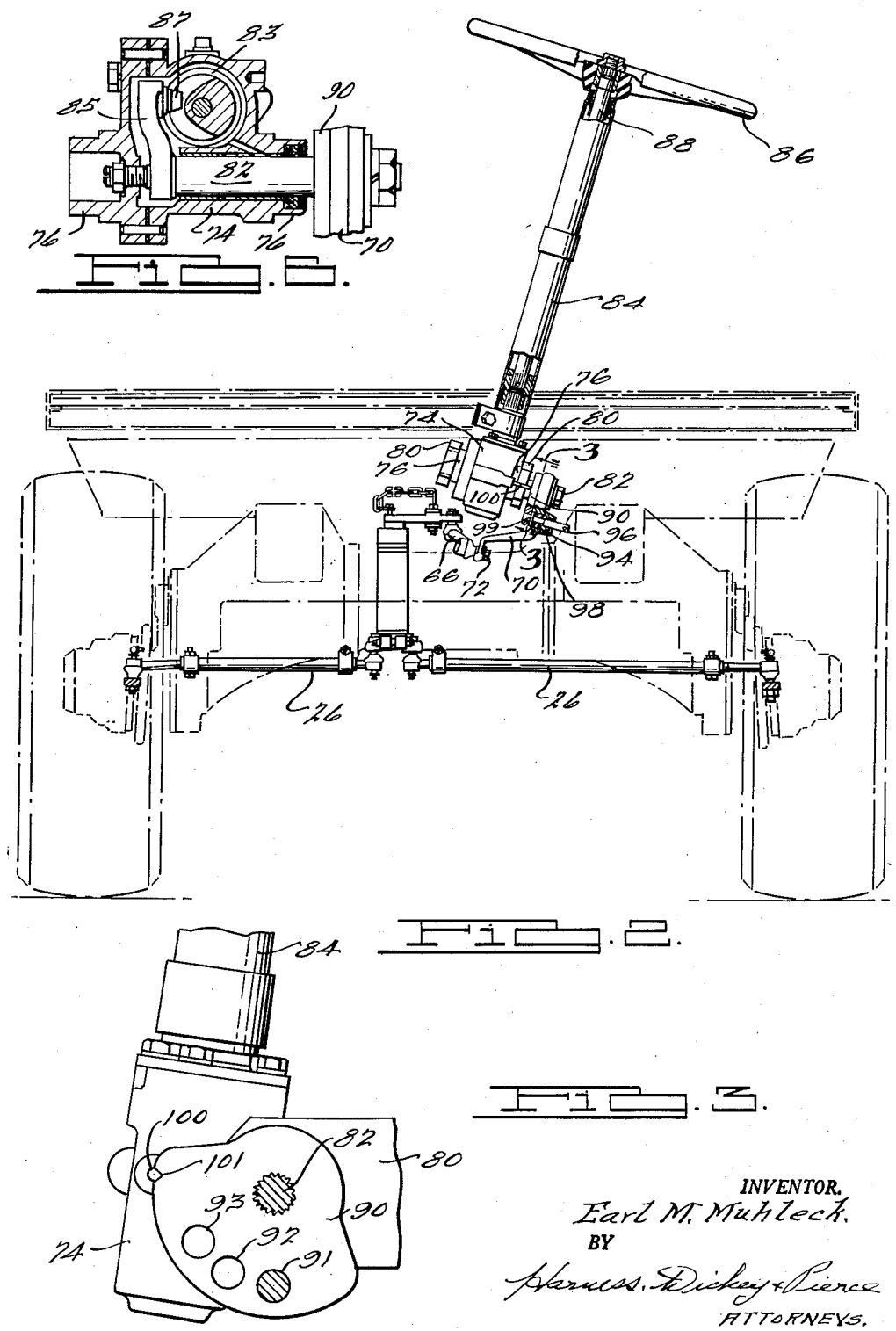
INVENTOR.
Earl M. Muhleck.
BY
Harness, Dickey & Pierce
ATTORNEYS.

March 14, 1961 E. M. MUHLECK 2,974,973
STEERING ASSEMBLY FOR AUTOMOTIVE VEHICLES
Filed Feb. 21, 1958 4 Sheets-Sheet 3
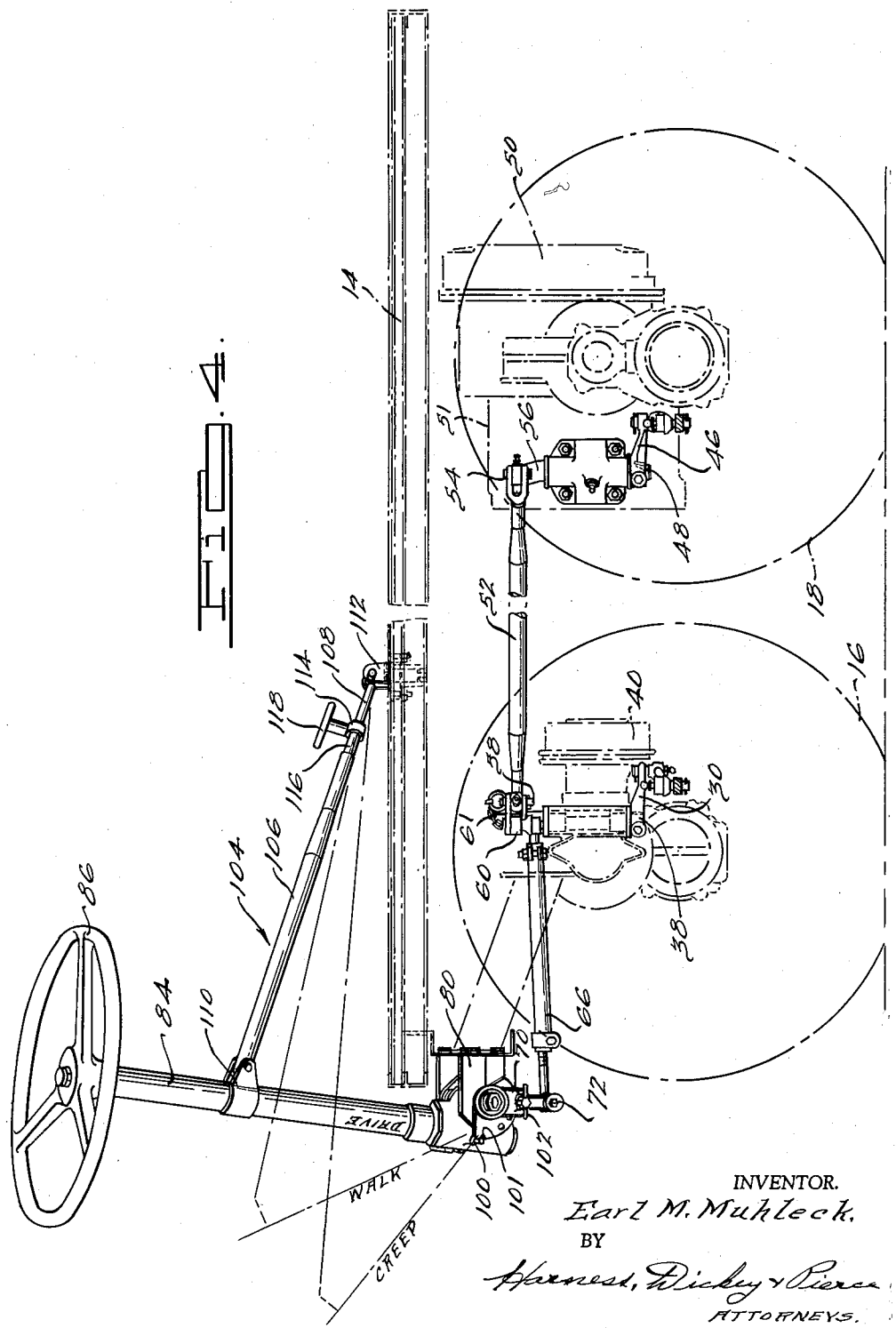
INVENTOR.
Earl M. Muhleck.
BY
Harness, Dickey & Pierce
ATTORNEYS.

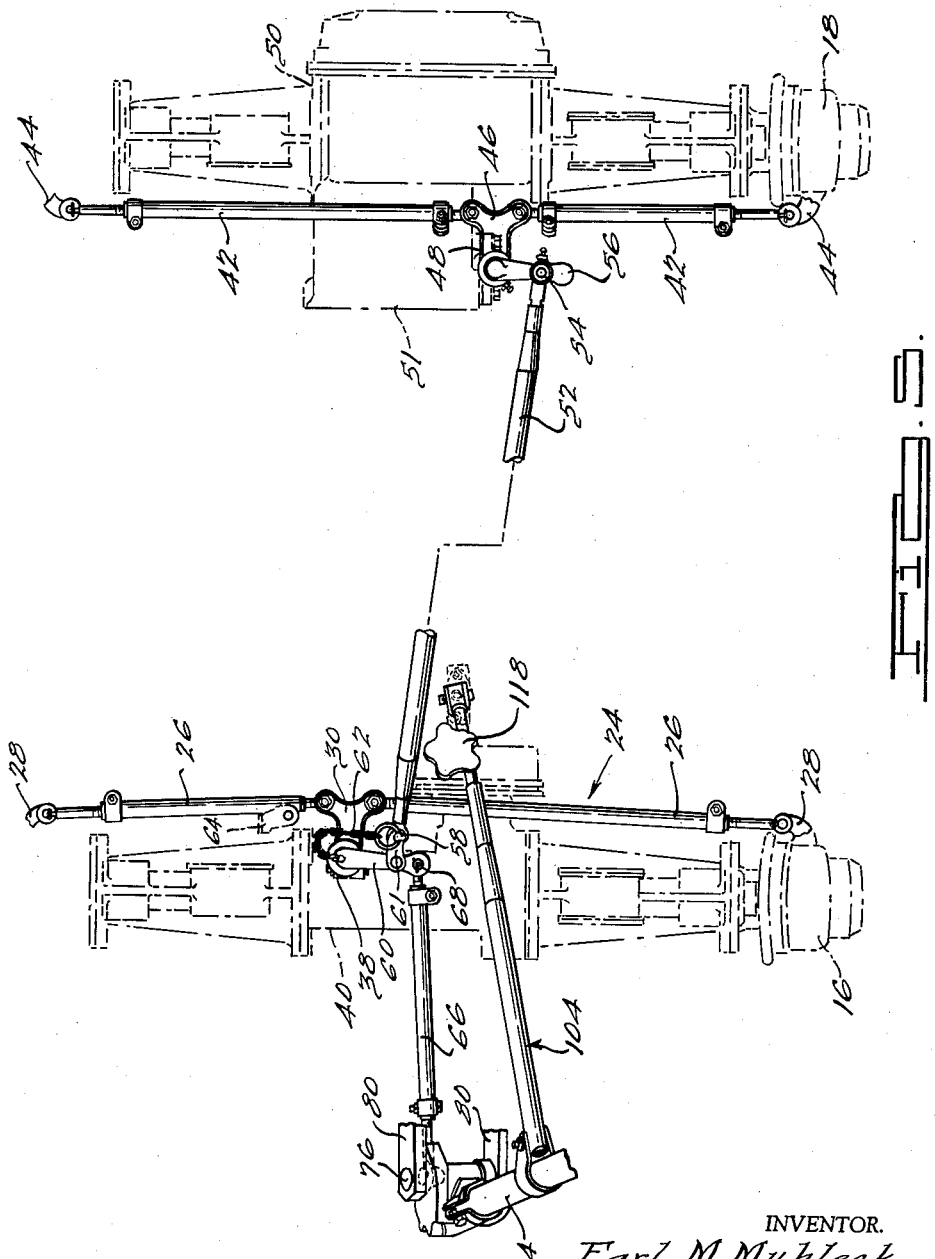

United States Patent Office 2,974,973
Patented Mar. 14, 1961

2,974,973
STEERING ASSEMBLY FOR AUTOMOTIVE VEHICLES

Earl M. Muhleck, Detroit, Mich., assignor, by mesne assignments, to Bank of America National Trust and Savings Association, a national banking association Filed Feb. 21, 1958, Ser. No. 716,576
2 Claims. (Cl. 280—87)

This invention relates generally to automotive vehicles and more particularly to a steering assembly for an automotive vehicle.

In some special purpose vehicles, an adjustable mounting of the steering wheel is desirable. An example of such a vehicle is a military type of vehicle which it is desired to steer from positions of the operator seated on the vehicle, walking beside the vehicle, or creeping on the ground adjacent the vehicle. This invention provides an adjustable and releasable connection of the steering wheel shaft with the steering linkage so that the steering wheel can be moved to any one of several moved positions and then connected to the steering linkage.

An object of this invention, therefore, is to provide an improved steering assembly for an automotive vehicle.

A further object of this invention is to provide a steering assembly of the above type which is simple in construction, economical to manufacture, and efficient in operation in providing for a ready support of the steering wheel in any one of several different positions.

Further objects, features and advantages of this invention will become apparent from a consideration of the following description, the appended claims and the accompanying drawing in which:

Fig. 2 is a front view of the steering assembly shown in Fig. 1 and illustrating the vehicle in broken lines;

Fig. 3 is an enlarged sectional view looking along the line 3—3 in Fig. 2;

Fig. 4 is a side elevational view of the steering assembly of this invention, showing a foreshortened side view of the vehicle in broken lines;

Fig. 5 is a fragmentary top plan view of the steering assembly, showing the vehicle front and rear axle assemblies in broken lines; and Fig. 6 is a sectional view showing the steering gear mechanism in the steering assembly of this invention.

Figure 1:
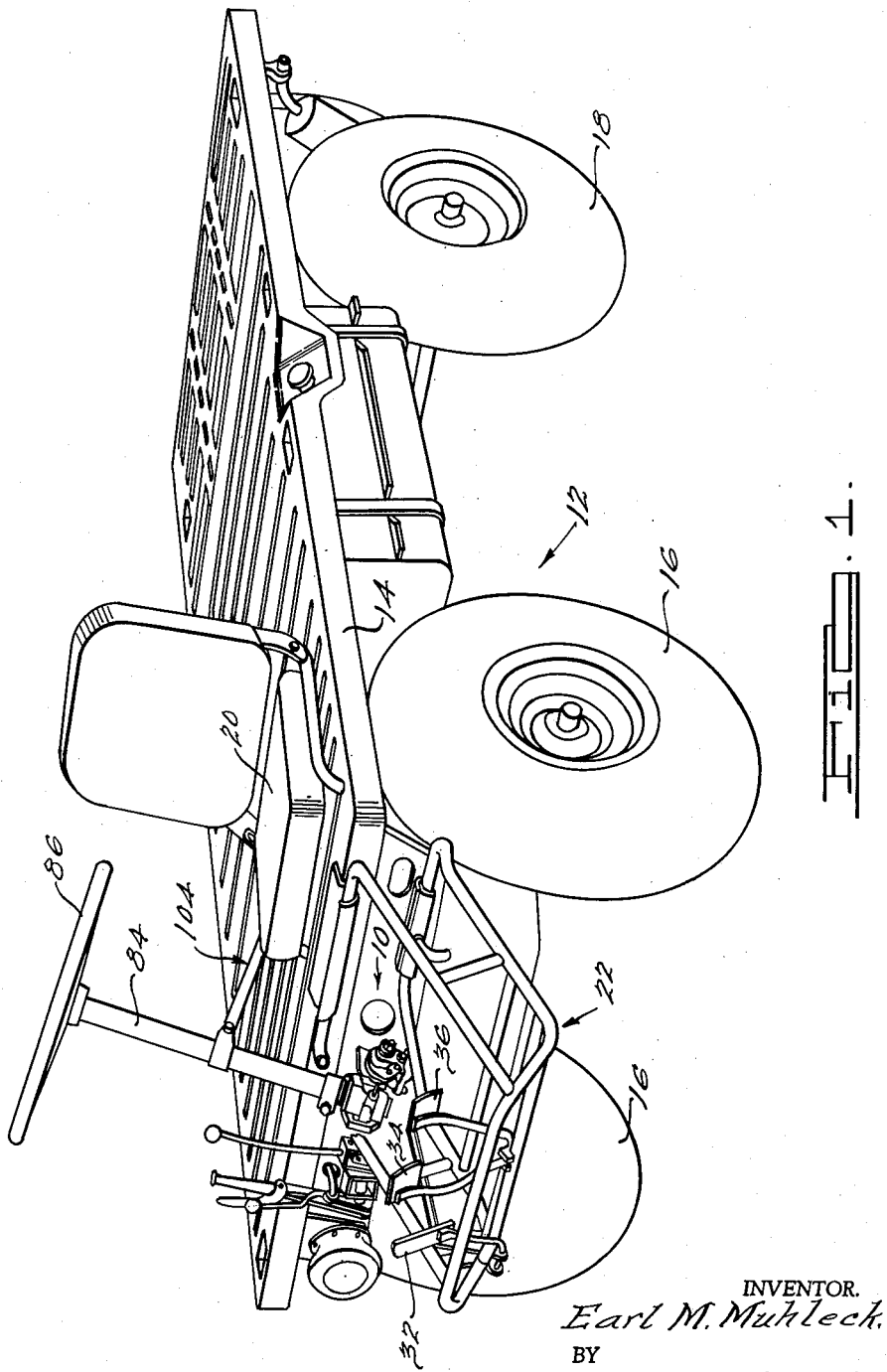
Fig. 1 is a perspective view of a military type of vehicle provided with the steering assembly of this invention.

With reference to the drawing, the steering assembly of this invention, indicated generally at 10, is illustrated in Fig. 1 in assembly relation with a vehicle 12 having a main frame 14 supported on front wheels 16 and rear wheels 18. An operator supporting seat 20 is mounted on the front left hand portion of the frame 14 which also carries an open frame assembly 22 that projects forwardly from the seat 20. The frame assembly 22 provides a support for a throttle control pedal 32, a brake pedal 34, and a clutch pedal 36, as well as constituting a foot rest for the operator.

The front and rear wheels 16 and 18, respectively, are steered by a linkage assembly indicated generally at 24 in Fig. 5. The linkage assembly 24 includes a pair of front tie rods 26 pivotally connected at their outer ends to projections 28 secured to the front wheels 16 and pivotally connected at their inner ends to the tie rod arm of a front two-plane bell crank 38, pivotally supported on the vehicle front axle unit 40. Similar rear tie rods 42 are pivotally connected at their outer ends to projections 44 on the rear wheels 18 and at their inner ends to the tie rod arm 46 of a rear two-plane bell crank 48 pivotally supported on a housing 51 on the rear axle assembly 50.

A rod 52 connected at its rear end by an upright pin 54 to a drag link arm 56 rigidly secured to the rear bell crank 48 and connected at its front end by a removable pin 58 to a leg member 61 on an upper portion 60 of the front bell crank 38, provides for movement of the rear tie rods 42 in response to steering movement of the front tie rods 26 to turn the front wheels 16. The pin 58, which is carried on a chain 62 connected to the bell crank 38, is removable from the position illustrated in Fig. 5 so that the rod 52 can be moved to a position in which the front end thereof is connectible to a stationary bracket 64 carried by the vehicle frame 14. In a position of the rod 52 connected to the bracket 64, the rear wheels 18 are not steerable. Accordingly, the rod 52 is only attached to the bracket 64 when only two wheel steering of the vehicle 12 is desired such as when the vehicle is being towed.

A rod 66 connected at its rear end by a pin 68 to the bell crank portion 60 is movable back and forth to rotate the front bell crank 38 to swing the tie rod arm 30 horizontally and turn the wheels 16 and 18 to steer the vehicle 12. The rod 66 is reciprocated in response to fore and aft swinging movement of a link member 70 connected at its lower end by pin 72 to the forward end of the rod 66 (Fig. 2). The link member 70 is rotatably supported at its upper end on an inclined shaft 82 which extends transversely of the vehicle 12 at the front end thereof.

The steering assembly 10 includes an ear housing 74 arranged at the front end of the frame 14 and provided at opposite sides with trunnions 76 that are rotatably mounted on trunnion-supporting plates 80 which project forwardly from the frame 14. The trunnions 76 are arranged in a coaxial relation with the shaft 82 as shown in Fig. 6.

A steering column 84 extends upwardly from the housing 74 and supports a steering wheel 86 connected to a shaft 88 which is positioned axially within the column 84. The shaft 88 is provided at its lower end with a worm 83 located in the housing 74. A lever or arm 85 on the inner end of the shaft 82 carries a pin 87 which engages and travels along the worm 83 on rotation of the worm. It is to be understood that other gear mechanisms for transmitting rotation of the steering shaft 88 to the shaft 82 in the desired ratio may be satisfactorily used. In the illustrated embodiment of the invention this ratio is 14:1.

A sector shape plate 90 (Figs. 2 and 3) illustrated as being splined on the shaft 82, but which may be secured in any suitable manner to the shaft 82 so as to rotate therewith, is provided with three spaced openings 91, 92, and 93 located on an arc which extends about the axis of the shaft 82. The upper end of the link 70 has a housing portion 94 which slidably supports a pin 96. A spring 98 extends between the housing 94 and a stop 99 on the pin to normally urge the pin toward a position projected into one of the openings 91, 92 or 93 in the plate 90. A handle 102 on the outer end of the pin 96 facilitates retraction of the pin from an opening 91, 92 or 93 against the pressure of the spring 98.

In Fig. 4, three different positions for the steering column 84 are illustrated, with these positions corresponding to "drive," "walk" and "creep" positions of the vehicle driver. When the pin 96 is withdrawn from the plate 90, the column 84 is readily swung fore and aft of the vehicle between the three illustrated positions, since there is no restraint to what can be termed the steering assembly output shaft 82. The column 84 is locked in the "drive" position shown in Fig. 4 when the pin 96 projects into the plate opening 91 and an indicator pin 100 on the gear housing 74 is horizontally aligned with a notch 101 in the plate 90. In this position of the steering column 84, the steering wheel 86 is located so that it is readily accessible to a driver seated on the seat 20.

A telescoping brace unit 104 (Fig. 4), consisting of a first tubular member 106 and a second smaller tubular member 108 slidable within the tubular member 106, extends between the steering column 84 and the frame 14 for further locking the steering column in the "drive" position. A first bracket 110 pivotally connects one end of the brace unit 104 to an intermediate portion of the steering column 84 and a second bracket 112 pivotally connects the opposite end of the brace unit 104 to the frame 14. A clamping mechanism 114 carried by the end 116 of tubular member 106 which surrounds the tubular member 108 is operable by a rotatable handle 118 to lock the tube members 106 and 108 together and fix the length of the brace unit 104.

To move the steering column 84 from the "drive" position to the "walk" position illustrated in Fig. 4, it is necessary to first rotate the clamp handle 118 to release the clamp so that the tubular members 106 and 108 are freely slidable relative to each other. The pin 96 is manually retracted by manipulation of the handle 102 so that it is free of the plate 90. The steering column 84 is then swung forwardly which causes rotation of the shaft 82 and the plate 90 through an angle corresponding to the angle of movement of the steering column 84. The steering column is moved to a position in which the opening 92 in the plate 90 is opposite the pin 96 which is then released so that it moves into the opening 92. The indicating pin 100 should still be opposite the notch 101.

In the event that during forward swinging movement of the steering column 84, the steering wheel shaft 88 turns instead of the shaft 82, or some turning movement of both shafts takes place, the steering column will have been advanced through an angle greater than the angle of rotation of the shaft 82 and the indicating pin 100 will have been advanced past the notch 101 so that some adjustment of the steering wheel 86 will be necessary before the pin 96 is inserted in the opening 92. The likelihood of any rotation of the shaft 88 for any reason is extremely remote. However, the indicating pin and notch arrangement makes it possible to insure a location of the pin 87 in a central portion of the worm 83 in the event the steering wheel 86 should for any reason be turned when the pin 96 is retracted. The clamp 114 is operated by turning of the handle 118 to fix the length of the brace 104 to maintain the steering column 84 in its "walk" position.

To move the steering column 84 to the "creep" position shown in Fig. 4, the above procedure is followed to locate the opening 93 in the plate 90 opposite the retainer pin 96. In all positions of the steering column 84, rotation of the steering wheel 86 effects a fore and aft swinging movement of the steering link 70 by virtue of the connection of the control plate 90 to the link 70 by means of the pin 96. Fore and aft swinging movement of the link 70 effects reciprocation of the rod 66 which in turn swings the idler arm 30 to effect movement of the tie rods 26 to turn the front wheels 16. The connecting rod 52 is operable to provide for a concurrent manipulation of the rear idler arm 46 to also steer the rear wheels 18 when desired.

The steering assembly 10 is economical to manufacture and install and provides for effective steering of the vehicle in each one of the three illustrated positions for the steering column 84 which is also movable to a fourth position against the front end of the frame 14 during shipping of the vehicle 12. The steering column is readily moved from one position to the next by merely retracting the pin 96 and loosening the clamp 114.

Although the invention has been described with respect to a preferred embodiment thereof, it is to be understood that it is not to be so limited, since changes can be made therein which are within the scope of the invention as defined by the appended claims.

What is claimed is:

1. In a vehicle having a frame and road wheels mounted on said frame for steerable movement relative thereto; a steering assembly comprising a gear housing, trunnions on said housing rotatably mounting the housing on said frame, a steering wheel mounted on the housing, a shaft arranged in a coaxial relation with the trunnions and connected to the steering wheel for rotation in response to rotation of the steering wheel, a position control plate secured to said shaft and provided with openings corresponding to a plurality of positions of said steering wheel fore and aft of the vehicle, a link member rotatably mounted on said shaft and connectible to said road wheels for steering the wheels in response to movement of the link member, retractable pin means carried by said link member and movable into a selected one of said control plate openings for connecting the shaft to the link member, and brace means connected to and extending between said column and said frame for locking said steering wheel in said positions.

2. In a vehicle having a frame, road wheels mounted on said frame for steerable movement relative thereto, and an operator's seat on said frame at the front end thereof; a steering assembly comprising a gear housing pivotally mounted on the front end of said frame for fore and aft swinging movement about a downwardly inclined axis extending transversely of said frame, a steering column and wheel assembly mounted on said housing so that in one position of the housing the steering wheel is in front of and can be steered from said seat, a shaft arranged in a coaxial relation with said axis and operatively associated with said steering wheel so that said shaft is rotated in response to steering movement of said steering wheel, a steering link rotatably supported on said shaft and connected to said road wheels, a position control plate secured to said shaft for rotation therewith and provided with a plurality of openings located on an arc extended about said axis, a locking pin carried by said steering link and adapted to be extended into one of said openings for releasably locking said steering link to said control plate so that said steering link is moved in response to steering movement of said steering wheel, whereby on movement of said locking pin out of said openings said housing and column are rotatable about said axis.

References Cited in the file of this patent

UNITED STATES PATENTS

| 743,013 | Mott | Nov. 3, 1903 |
| 756,670 | Marr | Apr. 5, 1904 |
| 1,623,493 | Postlethwait | Apr. 5, 1927 |

FOREIGN PATENTS

| 507,043 | France | June 12, 1920 |
| 891,507 | Germany | Sept. 28, 1953 |
| 17,057 | Great Britain | of 1903 |